D. T. WALLACE.
NUT LOCK.
APPLICATION FILED DEC. 12, 1910.
1,210,736.
Patented Jan. 2, 1917.
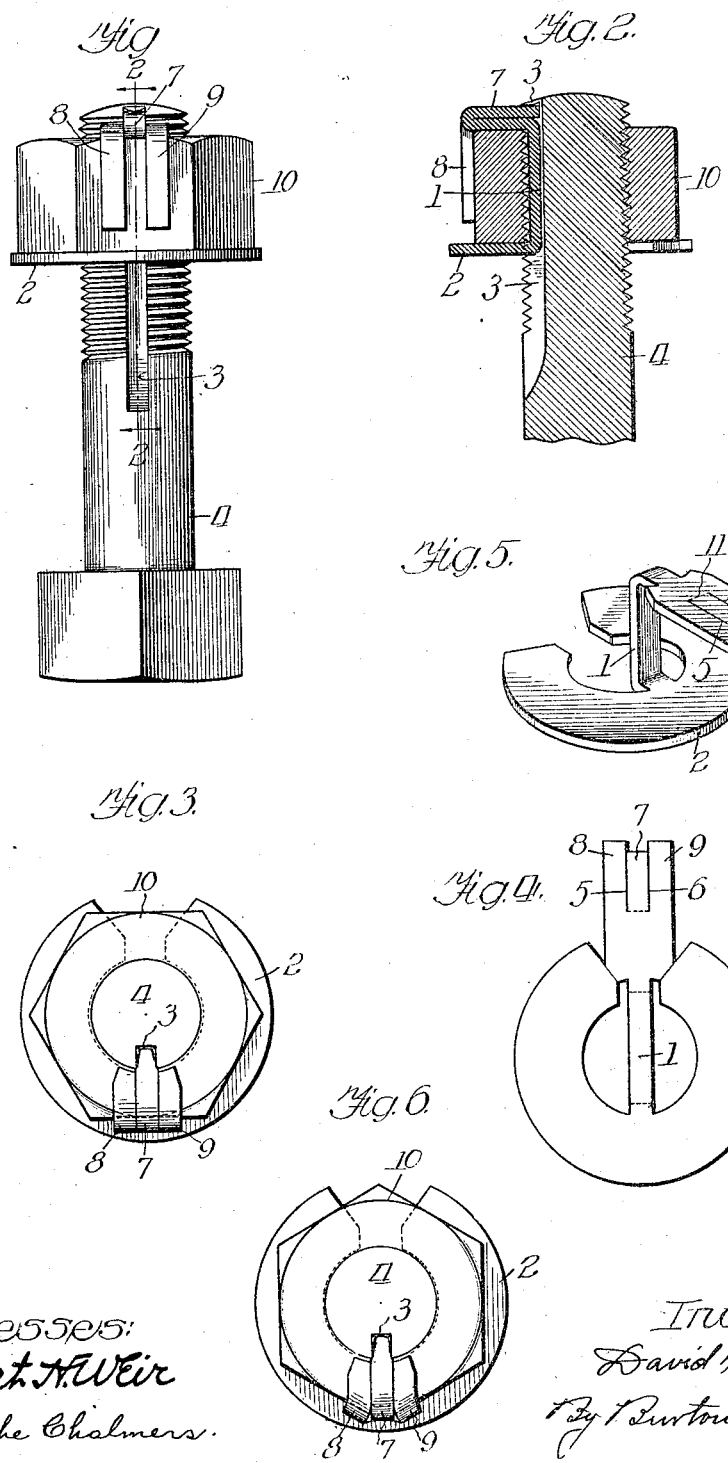
Witnesses:
Robert H. Weir
Blanche Chalmers.
Inventor:
David T. Wallace
By Burton U. Hill
Atty.

UNITED STATES PATENT OFFICE.

DAVID T. WALLACE, OF CHICAGO, ILLINOIS, ASSIGNOR OF ONE-THIRD TO FRANK M. HOOD, OF PARK RIDGE, ILLINOIS.

NUT-LOCK.

1,210,736. Specification of Letters Patent. Patented Jan. 2, 1917.

Application filed December 12, 1910. Serial No. 596,783.

*To all whom it may concern:*

Be it known that I, DAVID T. WALLACE, a citizen of the United States, residing at Chicago, in the county of Cook and State of Illinois, have invented certain new and useful Improvements in Nut-Locks, of which the following is a description.

My improvement relates to means for securing a nut in position upon a bolt to prevent its accidental displacement in service.

The object of my invention is to provide a simple, durable, efficient and reliable device of the kind described.

To this end my invention consists in the novel construction, arrangement and combination of parts herein shown and described, and more particularly pointed out in the claims.

In the accompanying drawings wherein like or similar reference characters indicate like or corresponding parts: Figure 1 is a side elevation of a bolt equipped with my device. Fig. 2, is a section taken substantially on line 2—2 of Fig. 1. Fig. 3, is an end view of the form of my device shown in Fig. 1. Fig. 4, is a detail of a blank for constructing my device before the same is bent into form. Fig. 5, is a complete device ready to be inserted in a nut. Fig. 6, is a view similar to Fig. 3, but showing the nut locked in a slightly different position in my device.

In the preferred form shown in the drawing, my invention consists of a single piece of sheet metal or other suitable material cut or otherwise suitably formed and comprises a substantially straight shank or stem 1, provided at one end with a pair of curved arms or wings 2—2 of substantially uniform width and length, adapted to jointly form a substantially circular band, open at one side, adapted to serve as a washer or bearing plate between the nut and the material which the bolt is adapted to secure in position. The body portion of the shank 1 is preferably of substantially uniform width, adapted to snugly fit a suitable slot or groove 3 formed in the threaded portion of the bolt 4. The end of the shank 1 opposite the arms 2 is preferably increased in width near its extremity and divided into three parts 7, 8 and 9 by two slits 5 and 6. The central part 7 is preferably slightly shorter than the parts 8 and 9.

The bolt 4 and nut 10 may be of the usual or any preferred form or construction with a recess of any desired form or construction adapted to receive the shank 1 between them. In the form shown a longitudinal slot or groove 3 is formed at the threaded end of the bolt of sufficient length to receive the shank 1 and permit of its free longitudinal movement. The shank 1, as shown, extends inward radially of the arms 2—2 a sufficient distance to enter the slot 3 and is then bent at substantially right angles to the plane of the arms and extends through the nut where it is again bent at substantially right angles with a part near its extremity projecting beyond the margin of the outer face of the nut. The nut is then screwed down to the desired position, after which the parts 8 and 9 of my device are bent over to engage one of the angular faces of the nut, or in case the nut is positioned with the junction of two of its angular sides coming between the parts 8 and 9 of my device, as shown in Fig. 6 a more secure lock is provided by bending the part 8 over to engage one angular face and the part 9 to engage the adjacent angular face.

When thus arranged the locking effect of my device is sufficient for all ordinary classes of work and the part 7, may be entirely omitted from my device as by cutting the blank along the broken line 11 shown in Figs. 4 and 5, where however the part 7 is retained this portion of my device is arranged to bend back to form a brace for the tongue or shank 1 with its extremity positioned in the slot. The part 7 is preferably just enough wider than the slot 3 to bend transversely slightly as it is forced into the slot and the sharp edges of its margins are then resiliently forced against the sides of the slot forming an extremely rigid and secure fastening for the free end of the part 7. The slight bend also tends to greatly stiffen the part 7 against longitudinal bending or buckling and retains the locking parts rigidly in position.

Having thus described my improvement it is obvious that various immaterial modifications may be made in my device without departing from the spirit of my invention, hence I do not wish to be understood as limiting myself to the exact form or construction shown except as required by the appended claims.

What I claim as new and desire to secure by Letters Patent is:

1. A device of the kind described comprising a threaded bolt having a slot extending longitudinally thereof and a nut of substantially uniform thickness and having a substantially flat bearing face coöperating with said bolt, in combination with means adapted to coöperate with the bearing face of said nut and provided with a part extending into said slot and through said nut with its free end of greater width and formed with a plurality of arms each adapted to bend over and engage an angular side at the periphery of said nut.

2. A device of the kind described, comprising a threaded bolt having a slot extending longitudinally thereof and a nut of substantially uniform thickness and having a substantially flat bearing face coöperating with said bolt, in combination with a washer having a tongue extending into said slot and through said nut, a forked part at the free end of said tongue adapted to bend over and engage the adjacent angular sides at the periphery of the nut.

In testimony whereof, I have hereunto signed my name in the presence of two subscribing witnesses.

DAVID T. WALLACE.

Witnesses:
BLANCHE CHALMERS,
BURTON H. HILLS.

Copies of this patent may be obtained for five cents each, by addressing the "Commissioner of Patents, Washington, D. C."